United States Patent [19]

Delacroix et al.

[11] Patent Number: 4,959,619

[45] Date of Patent: Sep. 25, 1990

[54] DIGITAL TRANSMISSION DEMODULATOR INCLUDING AN AUTOMATIC FAULT CORRECTOR

[75] Inventors: Eugène Delacroix, Vanves; Jean-Marc Fargeas, Massy Villaine; Jean-Claude Imbeaux, Paris Cedex, all of France

[73] Assignee: ETAT FRANCAIS, repreésenté par la Ministre des Postes, Télécommunications et de l'Espace (Centre National d'Etudes des Télécommunications), Issy les Moulineaux, France

[21] Appl. No.: 439,618

[22] Filed: Nov. 20, 1989

[30] Foreign Application Priority Data

Nov. 21, 1988 [FR] France ............................... 88 15103

[51] Int. Cl.$^5$ ............................................. H03D 1/00
[52] U.S. Cl. ..................................... 329/306; 329/310
[58] Field of Search ......................... 329/304, 306–310; 375/39

[56] References Cited

U.S. PATENT DOCUMENTS 4,027,250  5/1977  Lang ........................ 375/13
4,574,244  3/1986  Head ................................. 329/308

FOREIGN PATENT DOCUMENTS 0116902  8/1984  European Pat. Off. .

*Primary Examiner*—Robert J. Pascal
*Attorney, Agent, or Firm*—Blakely, Sokoloff, Taylor & Zafman

[57] ABSTRACT

A conventional demodulator for digital transmission includes means (12) for splitting the received HF signal into two identical auxiliary signals, mixers (20, 30) for transposing the auxiliary signals into in-phase and quadrature baseband components by multiplying them with in-phase and quadrature output signals from a local oscillator (14), and respective filter and amplifier means (22, 24; 32, 34) and analog-to-digital converters (26, 36) on the in-phase and quadrature channels. In addition, the demodulator includes estimation means (100) suitable for estimating faults on groups of samples ($Y_{p,k}$, $Y_{q,k}$) taken from the outputs of the analog-to-digital converters (26, 36), with the faults being estimated in the form of five parameters, and correction means (200) for correcting current samples ($Y_p$, $Y_q$) on the basis of the parameters estimated on an earlier group of samples.

14 Claims, 8 Drawing Sheets

FIG_1
PRIOR ART

FIG_2

FIG.3    FLOWCHART OF THE PROCESSING PERFORMED BY THE ESTIMATION MEANS 100

FIG_4

FIG_5

FIG_6

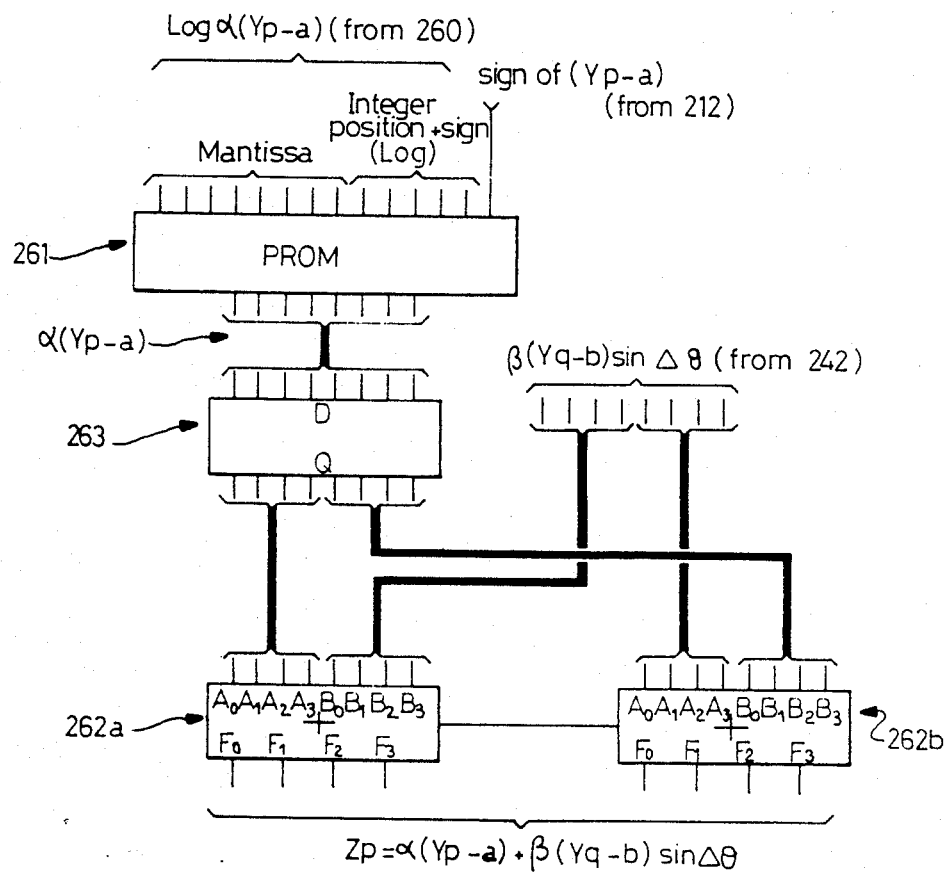
FIG_8

DIGITAL TRANSMISSION DEMODULATOR INCLUDING AN AUTOMATIC FAULT CORRECTOR

The present invention relates to digital transmission.

It relates more particularly to demodulators for demodulating digital transmission by using conventional techniques for transposing the signal to baseband, as shown in accompanying FIG. 1.

BACKGROUND OF THE INVENTION

As shown in this figure, in such a conventional demodulator, the received high frequency signal is initially amplified by an automatic gain control circuit 10 for regulating its level. The amplified received signal is then split into two identical signals by a coupler 12.

The output signal from a non-synchronized local oscillator 14 whose nominal frequency is close to that of the received signal is applied in parallel both to a cell 16 having a first output 17 on which it delivers an in-phase oscillator signal and a second output 18 on which it delivers a quadrature oscillator signal which is phase shifted by 90°.

One of the two signals from the coupler 12 is transposed into in-phase baseband by being multiplied in a mixer 20 with the in-phase oscillator signal from the output 17 of the cell 16. The other signal from the coupler 12 is transposed into quadrature baseband in a mixer 30 by being multiplied with the quadrature oscillator signal from the output 18 of the cell 16.

The signals from the mixers 20 and 30 are applied to respective lowpass filters 22 and 32. In this way, the outputs of the two filters 22 and 32 provide two components, namely an in-phase component and a quadrature component, representative of the received signal. These components are applied to respective amplifiers 24 and 34 and then to respective analog-to-digital converters 26 and 36. Thus, the outputs of the analog-to-digital converters 26 and 36 provide respective samples $Y_{p,k}$ and $Y_{q,k}$ (where p designates in-phase component samples, q designates quadrature component samples, and k designates sample rank or number).

Synchronizing and decision-making functions are then performed by digital processing specific to the type of modulation used and performed in a unit given general reference 40 in FIG. 1.

The Applicants have observed that the analog portion of the demodulator, prior to the digital processing suffers from several faults:

- level regulation is not perfect, thereby causing sample level to vary as a function of fluctuations in the received signal;
- the two channels may be unbalanced in amplitude due to different gains;
- the rest voltages of the channels may be offset in the amplifiers 24, 34, and/or in the analog-to-digital converters 26, 36; and
- the two demodulated channels may not be exactly in quadrature with each other.

These faults also depend on operating frequency and on temperature. They are therefore difficult to compensate using known techniques. They degrade demodulator performance (i.e. they increase the binary error rate).

The performance of a digital link is generally evaluated from the curve of bit error rate (TEB) as a function of the ratio Eb/No (where Eb=the energy expended for transmitting one bit, and No=the noise power density on the link).

The existence of demodulator faults gives rise to a need to increase the ratio Eb/No by a quantity $\delta$(Eb/No) in order to obtain the same error rate as would be obtained if there were no faults. The following examples are intended to illustrate this phenomenon.

With BPSK (binary phase shift keying) having voltage offsets on one channel, or with QPSK (quaternary phase shift keying) with identical offsets on both channels, the ratio Eb/No at low error rates (TEB<$10^{-6}$) is degraded as follows:

$\delta$(Eb/No)=0.3 dB for an offset of 5% of the useful signal; and $\delta$(Eb/No)=0.7 dB for an offset of 10% of the useful signal.

With QPSK and a quadrature error $\delta\theta$ between the two channels, the resulting degradation can be considered as being due to an error in carrier recovery equal to $\frac{1}{2}\delta\theta$, giving:

$\delta$(Eb/No)=0.4 dB for $\delta\theta=5°$; and $\delta$(Eb/No)=0.8 dB for $\delta\theta=10°$.

The object of the present invention is to propose a circuit for dynamically estimating and correcting in digital manner the above-described faults in the analog portion of the modulator, without requiring a test signal and without disturbing the link in operation, thereby improving transmission performance.

SUMMARY OF THE INVENTION

The present invention provides a demodulator for digital transmission using the technique known per se of transposing the signal to baseband and comprising separator means for separating a received HF signal into first and second identical auxiliary signals, a local oscillator providing an in-phase output signal and a quadrature output signal at 90° to its in-phase output signal, a first mixer for transposing the first auxiliary signal into an in-phase base component by multiplying it with the in-phase output signal from the local oscillator, a second mixer for transposing the second auxiliary signal into a quadrature base component by multiplying it with the quadrature output signal from the local oscillator, and respective filter and amplifier means and analog-to-digital converters connected to the outputs from each of the mixers, the demodulator further comprising:

estimation means suitable for estimating faults on groups of samples $Y_{p,k}$, $Y_{q,k}$ taken from the outputs of the analog-to-digital converters, the faults being estimated in the form of five parameters, namely: the corrective gain $\alpha$ to be applied to the in-phase channel, the corrective gain $\beta$ to be applied to the quadrature channel, the voltage offset a on the in-phase channel, the voltage offset b on the quadrature channel, and phase error $\delta\theta$ relative to true quadrature; and correction means for correcting the current samples $Y_p$, $Y_q$, on the basis of the parameters estimated on an earlier group of samples.

BRIEF DESCRIPTION OF THE DRAWINGS

An embodiment of the invention is described by way of example with reference to the accompanying drawings, in which:

FIGS. 5, 6, 7, and 8 are block diagrams of four subassemblies of the corrector means.

DETAILED DESCRIPTION

Figure 1:
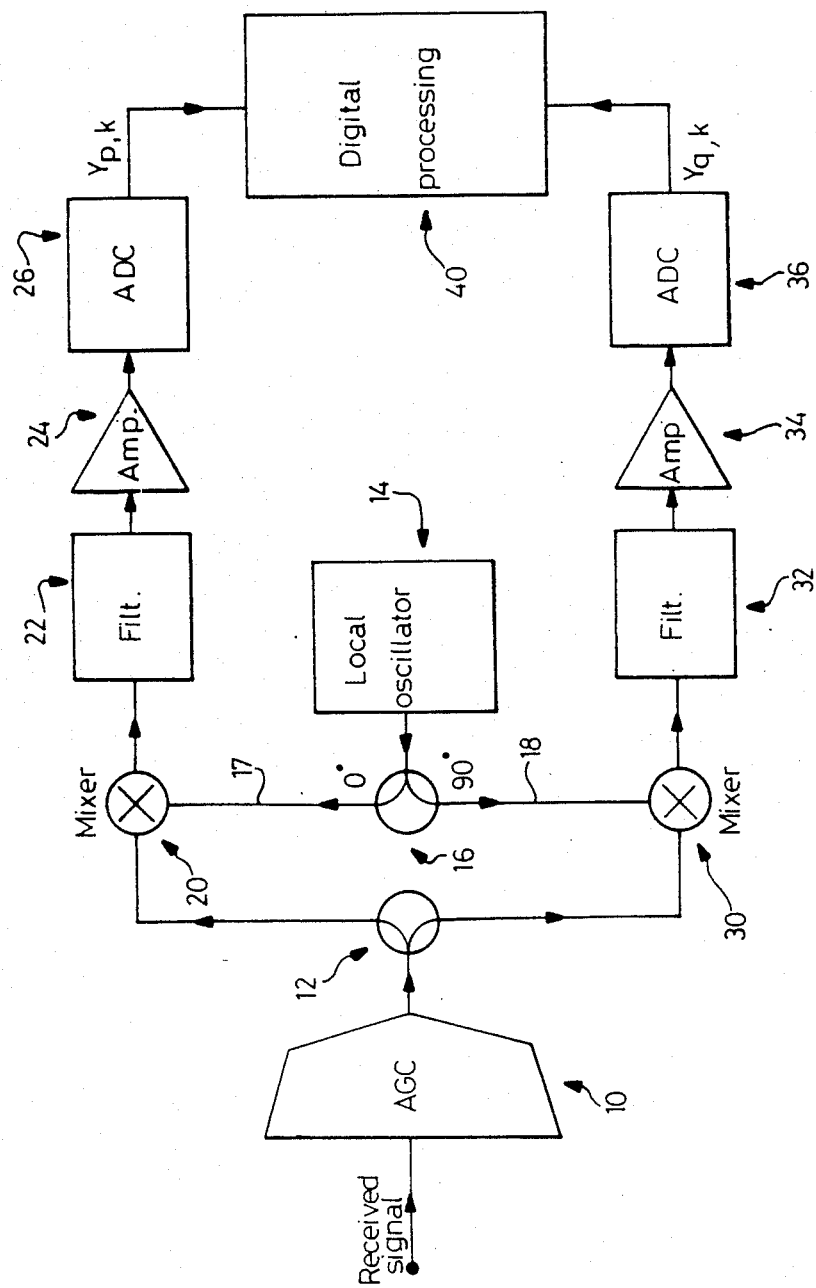
FIG. 1 is a block diagram of a conventional prior art demodulator.
Figure 2:
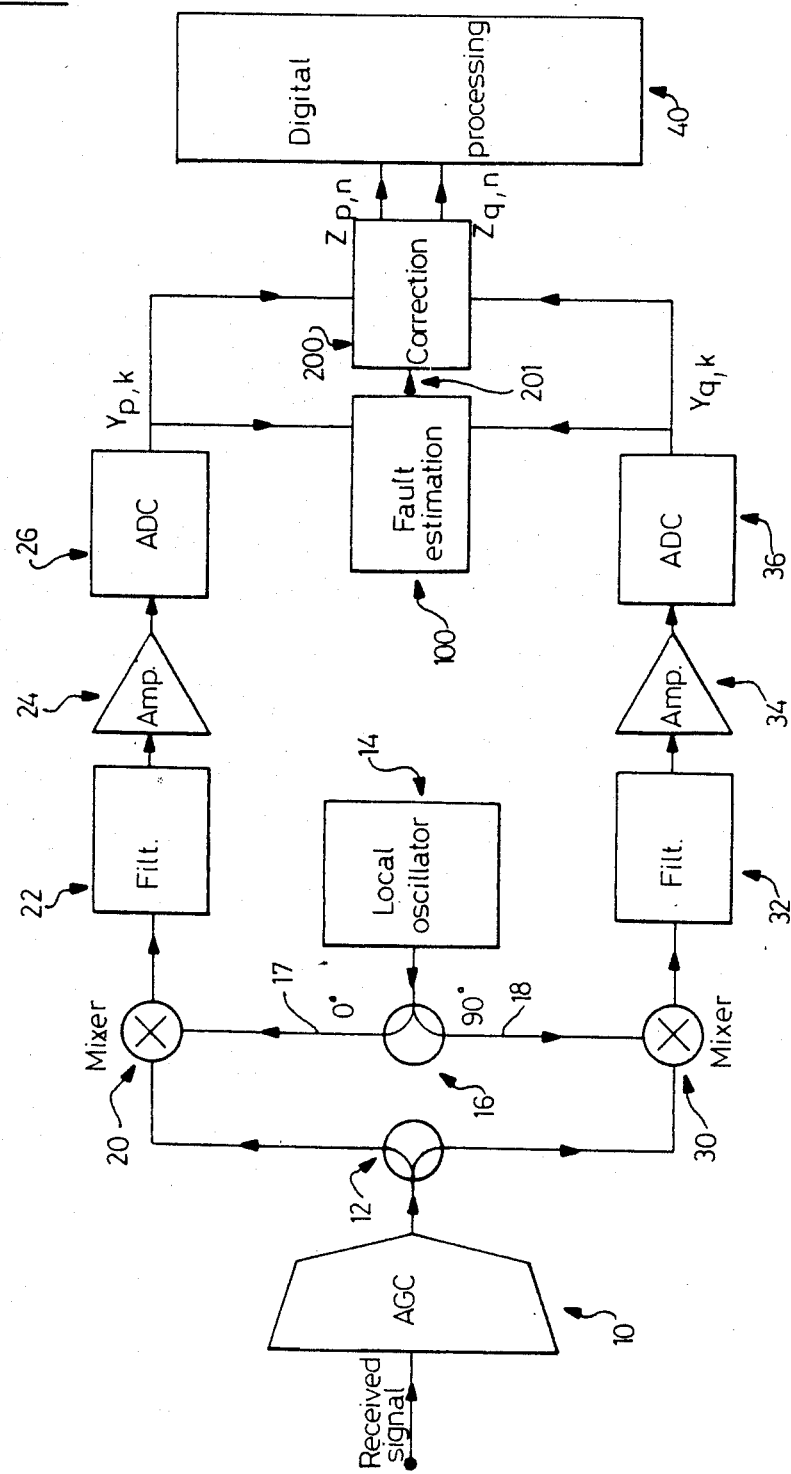
FIG. 2 is a block diagram of a demodulator of the invention.

Accompanying FIG. 2 shows an automatic gain control circuit 10, a coupler 12, a local oscillator 14, a cell 16, two mixers 20 and 30, two filters 22 and 32, two amplifiers 24 and 34, two analog-to-digital converters 26 and 36, and a digital processing unit 40 which are the same as described above with reference to FIG. 1.

In addition, FIG. 2 shows fault estimation means 100 and correction means 200 inserted between the outputs from the analog-to-digital converters 26 and 36 and the inputs to the synchronizing and decision-making circuit 40.

As mentioned above, the fault estimation means 100 estimate the value of faults in the form of five parameters, on the basis of a sequence of samples $Y_{p,k}$ and $Y_{q,k}$. Thereafter, the correction means 200 reconstitute corrected samples $Z_{p,n}$ and $Z_{q,n}$ on the basis of the current samples $Y_{p,n}$ and $Y_{q,n}$.

The parameter a corresponding to any offset in the voltage on the in-phase channel is estimated by taking the average of the samples $Y_{p,k}$:

$$a = \frac{1}{N} \sum_{k=1}^{N} Y_{p,k} \tag{1}$$

The parameter b corresponding to any voltage offset on the quadrature channel is similarly estimated by taking the average of the samples $Y_{q,k}$:

$$b = \frac{1}{N} \sum_{k=1}^{N} Y_{q,k} \tag{2}$$

The number N of samples to be taken into account in this calculation is selected as a function of the noise level on the link and as a function of the desired accuracy.

If there is no desire to provide additional level regulation on the corrected samples $Z_{p,n}$ and $Z_{q,n}$, then there is no need to evaluate the parameters $\alpha$ and $\beta$ which correspond respectively to the corrective gain to be inserted on the in-phase channel and the corrective gain to be inserted on the quadrature channel, and it suffices to evaluate only the ratio $\alpha/\beta$. Under such circumstances, the value of $\alpha$ (or $\beta$) can be fixed arbitrarily, and there is one less parameter to be estimated.

The ratio $\alpha/\beta$ is obtained by averaging the squares of the differences $(Y_{p,k}-a)$ and $(Y_{q,k}-b)$:

$$\alpha/\beta = \sqrt{\sum_{k=1}^{N} (Y_{q,k} - b)^2} / \sqrt{\sum_{k=1}^{N} (Y_{p,k} - a)^2} \tag{3}$$

In order to estimate $\alpha$ and $\beta$ individually and also the parameter which represents phase error compared with true quadrature, it is also necessary to calculate the average of the products of the differences $(Y_{p,k}-a)$ and $(Y_{q,k}-b)$.

The parameters $\alpha$ and $\beta$ are obtained on the basis of the following equations:

$$\alpha = \frac{\sigma \sqrt{N} \sqrt{\sum_{k=1}^{N} (Y_{q,k} - b)^2}}{\sqrt{\sum_{k=1}^{N} (Y_{p,k} - a)^2 \cdot \sum_{k=1}^{N} (Y_{q,k} - b)^2 - \left[\sum_{k=1}^{N} (Y_{p,k} - a)(Y_{q,k} - b)\right]^2}} \tag{4}$$

$$\beta = \frac{\sigma \sqrt{N} \sqrt{\sum_{k=1}^{N} (Y_{p,k} - a)^2}}{\sqrt{\sum_{k=1}^{N} (Y_{p,k} - a)^2 \cdot \sum_{k=1}^{N} (Y_{q,k} - b)^2 - \left[\sum_{k=1}^{N} (Y_{p,k} - a)(Y_{q,k} - b)\right]^2}} \tag{5}$$

In the above equations, $\sigma$ represents the reference value for the mean of the squares of the corrected samples. The parameter $\delta\theta$ may be obtained in the form:

$$\sin \delta\theta = -\sum_{k=1}^{N} (Y_{p,k} - a)(Y_{q,k} - b) / \sqrt{\sum_{k=1}^{N} (Y_{p,k} - a)^2 \cdot \sum_{k=1}^{N} (Y_{q,k} - b)^2} \tag{6}$$

Given the slowness of variations in the parameters to be estimated, the estimation means 100 may operate at a speed which is slow compared with the rate at which the samples $Y_{p,k}$ and $Y_{q,k}$ are output. It suffices merely to repeat estimation periodically on a block of N samples which need not even necessarily be immediately consecutive.

The correction means 200 then determine the corrected samples using the following equations:

$$Z_{p,n} = \alpha(Y_{p,n} - a) + \beta(Y_{q,n} - b) \cdot \sin\delta\theta \tag{7}$$

$$Z_{q,n} = \beta(Y_{q,n} - b) \cdot \cos \delta\theta \tag{8}$$

Although the estimation means 100 may operate at a speed which is relatively slow compared with the sample rate, as mentioned above, the correction means 200 must necessarily operate at the rate at which the samples $Y_{p,n}$ and $Y_{q,n}$ are delivered from the analog-to-digital converters 26 and 36.

Since estimating faults in the form of the five parameters a, b, $\alpha$, $\beta$, and $\delta\theta$ by the means 100 can be done relatively slowly and requires several calculation steps, it appears advantageous, at present, to constitute the estimation means 100 by means of a microprocessor.

In contrast, since the correction means 200 are required to operate at high speed (up to 6M samples per second) the correction means 200 are preferably constituted by hard wired logic.

Figure 3:
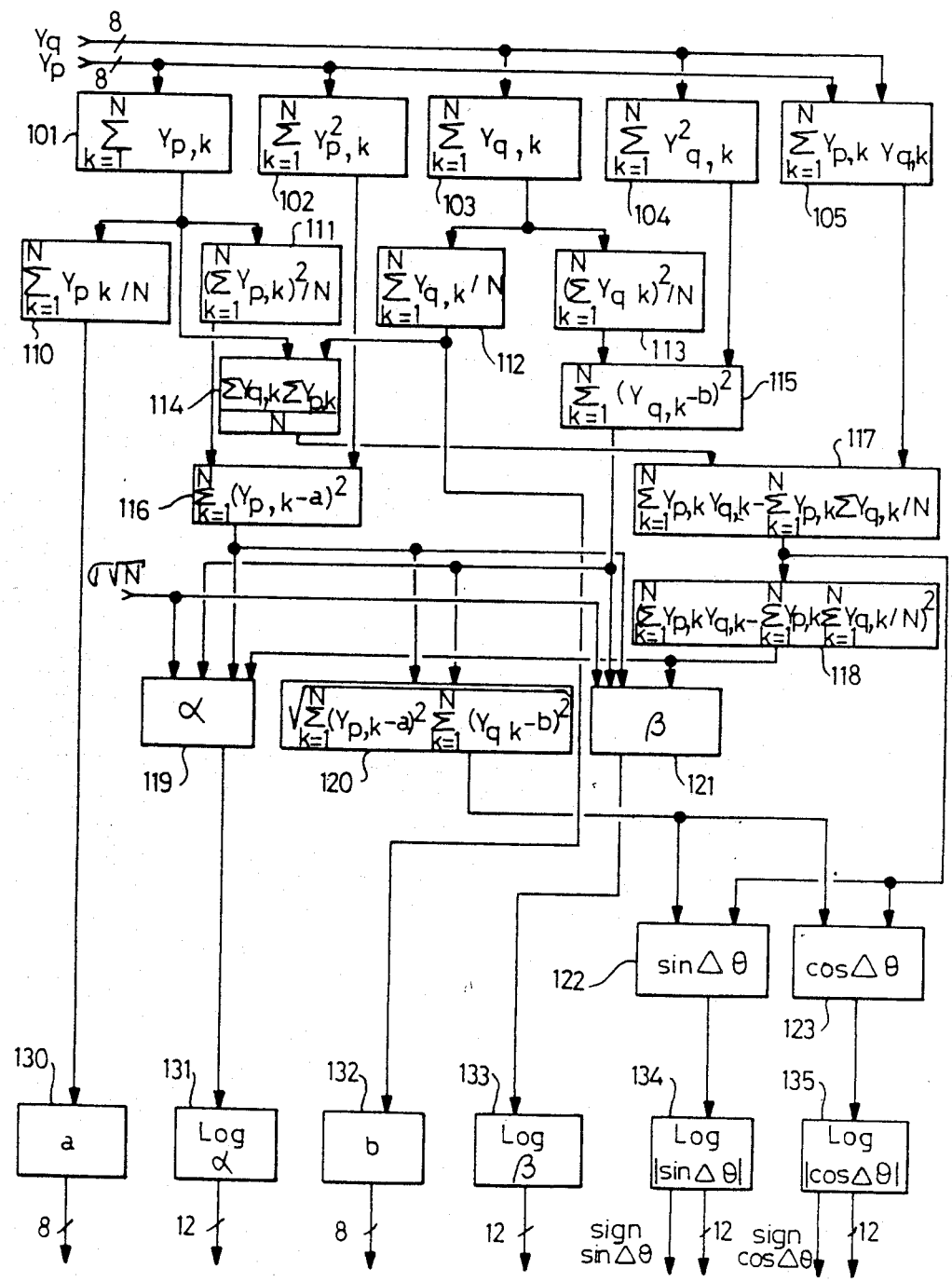
FIG. 3 is a flow chart of the processing performed by the means for estimating faults in the form of five parameters.

Accompanying FIG. 3 shows the flow chart of the processing for estimating the faults a, b, $\alpha$, $\beta$, and $\delta\theta$ as performed by the means 100.

The flow chart shown in accompanying FIG. 3 can be split into two distinct stages: a running calculation corresponding essentially to steps 101 to 105, and a final calculation corresponding to steps 110 to 123 and to steps 130 to 135.

In the stage corresponding to running calculation, the means 100 take N successive samples $Y_{p,k}$ and $Y_{q,k}$ of the input signals as coded on 8 bits, for example, and calculate the sums:

$$\sum_{k=1}^{N} Y_{p,k} \quad \text{(step 101)} \tag{9}$$

$$\sum_{k=1}^{N} Y_{p,k}^2 \quad \text{(step 102)} \tag{10}$$

$$\sum_{k=1}^{N} Y_{q,k} \quad \text{(step 103)} \tag{11}$$

$$\sum_{k=1}^{N} Y_{q,k}^2 \quad \text{(step 104)} \tag{12}$$

$$\sum_{k=1}^{N} Y_{p,k} Y_{q,k} \quad \text{(step 105)} \tag{13}$$

Once a block of N samples $Y_{p,k}$ and $Y_{q,k}$ has been taken into account for calculating the above sums, the means 100 calculate the following terms:

$$\sum_{k=1}^{N} Y_{p,k}/N \tag{14}$$

(step 110, using the result of step 101)

$$\left[ \sum_{k=1}^{N} Y_{p,k} \right]^2 / N \tag{15}$$

(step 111, using the result of step 101)

$$\sum_{k=1}^{N} Y_{q,k}/N \tag{16}$$

(step 112, using the result of step 103)

$$\left[ \sum_{k=1}^{N} Y_{q,k} \right]^2 / N \tag{17}$$

(step 113, using the result of step 103)

$$\left[ \sum_{k=1}^{N} Y_{p,k} \cdot \sum_{k=1}^{N} Y_{q,k} \right]/N \tag{18}$$

(step 114, using the results of steps 101 and 112)

$$\sum_{k=1}^{N} (Y_{q,k} - b)^2 \tag{19}$$

(step 115, using the results of steps 104 and 113)

$$\sum_{k=1}^{N} (Y_{p,k} - a)^2 \tag{20}$$

(step 116, using the results of steps 102 and 111)

$$\sum_{k=1}^{N} Y_{p,k} Y_{q,k} - \left[ \sum_{k=1}^{N} Y_{p,k} \cdot \sum_{k=1}^{N} Y_{q,k} \right]^2 / N \tag{21}$$

(step 117 using the results of steps 114 and 105)

$$\left[ \sum_{k=1}^{N} Y_{p,k} Y_{q,k} - \left[ \sum_{k=1}^{N} Y_{p,k} \cdot \sum_{k=1}^{N} Y_{q,k} \right]^2 / N \right]^2 \tag{22}$$

(step 118 using the result of steps 117)

value of $\alpha$ (23)

(step 119 using the results of steps 115, 116, and 118 and the value of $\sigma \sqrt{N}$)

$$\sum_{k=1}^{N} (Y_{p,k} - a)^2 \cdot \sum_{k=1}^{N} (Y_{q,k} - b)^2 \tag{24}$$

(step 120, using the results of steps 115 and 116)

value of $\beta$ (25)

(step 121 using the results of steps 115, 116, and 118 and the value of $\sigma \sqrt{N}$)

sin $\delta\theta$ (26)

(step 122, using the result of steps 117 and 120)

cos $\delta\theta$ (27)

(step 123, using the result of steps 117 and 120)

In order to simplify subsequent correction operations in the means 200, the means 100 do not provide $\alpha$, $\beta$, sin $\delta\theta$, and cos $\delta\theta$ directly, but their logarithms to base 2: log $\alpha$, log $\beta$, log$|\sin \delta\theta|$, log$|\cos \delta\theta|$ and the signs of sin $\delta\theta$ and cos $\delta\theta$.

FIG. 3 shows:

step 130 for obtaining the parameter a, e.g. on 8 bits, after step 110;

step 131 for obtaining the parameter log $\alpha$, e.g. on 12 bits, after step 119;

step 132, for obtaining the parameter b, e.g. on 8 bits, after step 112;

step 133, for obtaining the parameter log $\beta$, e.g. on 12 bits, after step 121;

step 134, for obtaining the parameter log$|\sin \delta\theta|$, e.g. on 12 bits, together with the sign of sin $\delta\theta$, after step 122; and step 135, for obtaining the parameter log$|\cos \delta\theta|$, e.g. on 12 bits, together with the sign of cos $\delta\theta$, after step 123.

In an advantageous implementation, the logarithms are provided on 12 bits, comprising 8 bits for the mantissa and 4 bits for the integer portion and the sign.

The parameters $\sigma$ and N are programmable, typical values may be: $\sigma = 64$ and N=4096.

Figure 4:
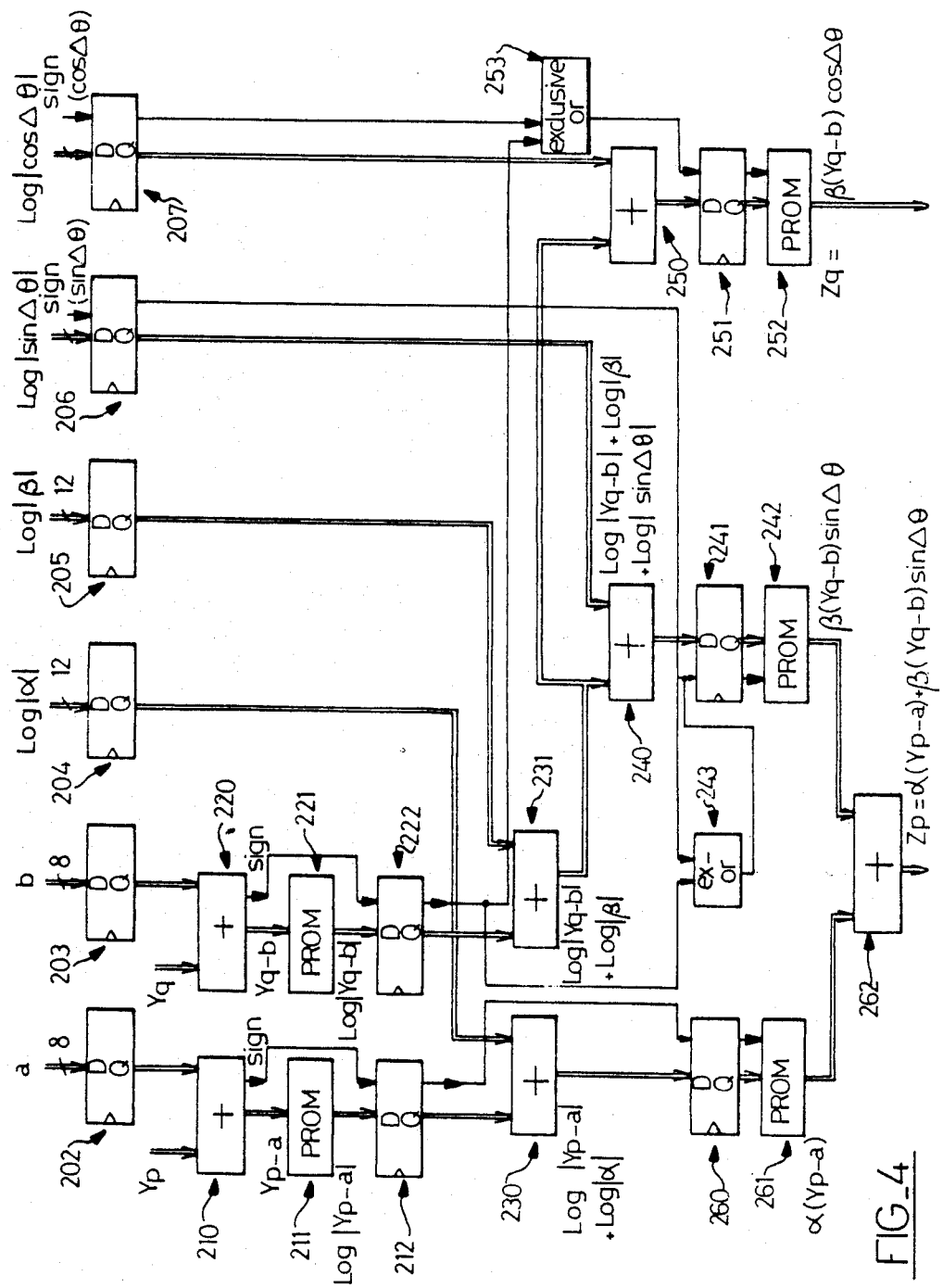
FIG. 4 is a block diagram of the corrector means per se.

FIG. 4 is a block diagram of the correction means 200. These means calculate corrected samples $Z_p$ and $2_q$ as a function of the samples $Y_p$ and $Y_q$ and of the estimated correction parameters: a, b, log$|\alpha|$, log$|\beta|$, log$|\sin \delta\theta|$, and log$|\cos \delta\theta|$, using equations (7) and (8) mentioned above.

In order to simplify the structure of the means 200, the products are calculated by means of logarithms, thereby avoiding any need to multiply and replacing multiplication by addition. When signs are involved, they are represented by separate bits and treated separately.

Converting numbers into their logarithms and vice versa are operations performed by reading programmable read only memories (PROMs).

Additions are performed using specialized arithmetic and logic units.

As shown in FIG. 4, in order to synchronize the signals and avoid random effects, the parameters a, b, $\log|\alpha|$, $\log|\beta|$, $\log|\sin \delta\theta|$, and $\log|\cos \delta\theta|$ are buffered via sets of bistables 202, 203, 204, 205, 206, and 207, respectively.

Figure 5:
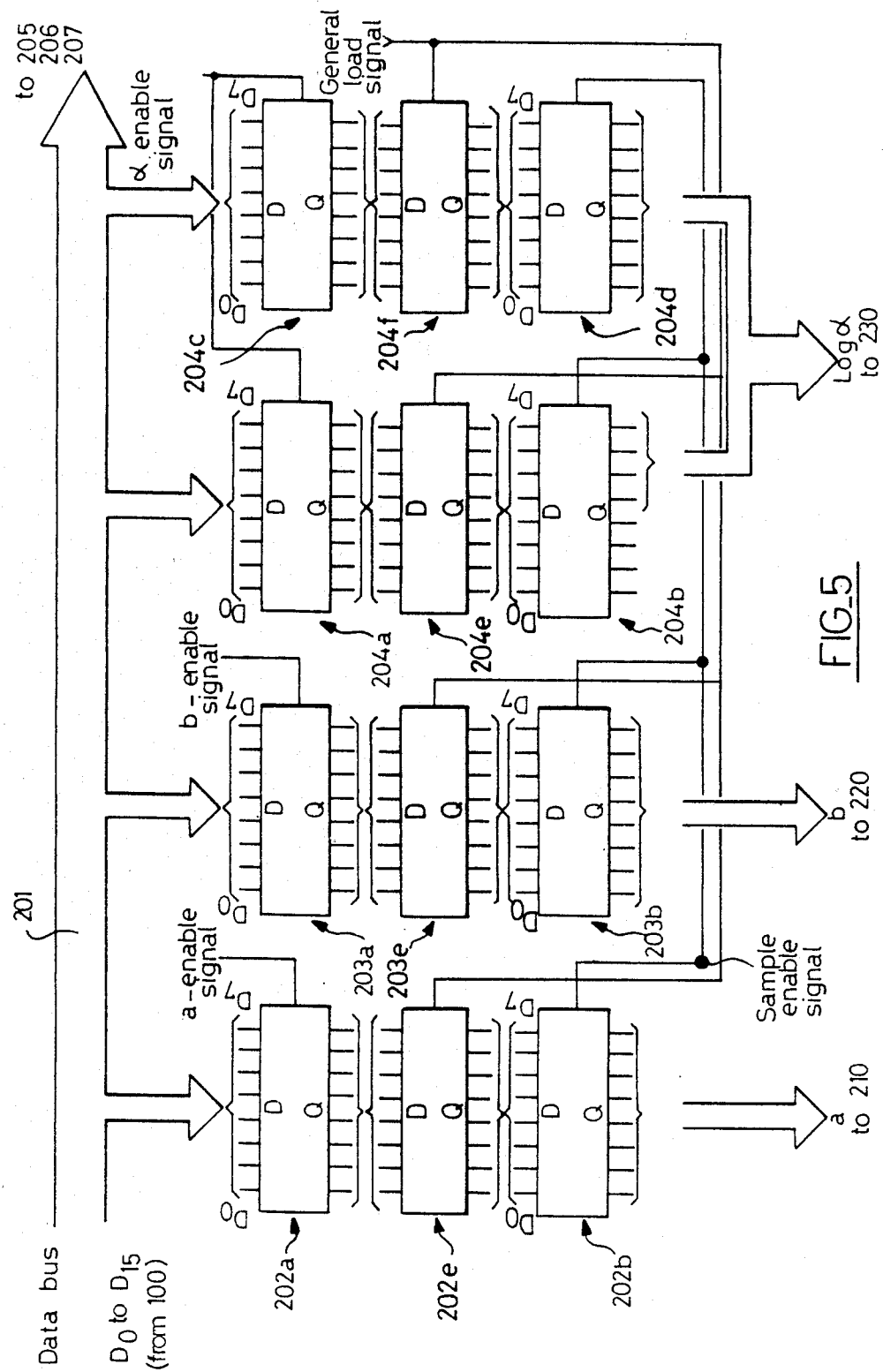

More precisely, as shown in detail in FIG. 5, for the parameters a, b, and $\log|\alpha|$, each set of bistables comprises a set of input bistables and two sets of readback bistables.

FIG. 5 thus shows a set of input bistables 202a for the parameter a, a set of input bistables 203a for the parameters b, and two sets of input bistables 204a and 204c for the parameter $\log|\alpha|$, with these sets of input bistables having their own inputs connected to a data bus 201.

The set of input bistables 202a is loaded when an a-enable signal appears.

Similarly, the set of input bistables 203a is loaded when a b-enable signal appears.

Finally, the two sets of inputs bistables 204a and 204c are loaded when an α-enable signal appears.

Sets of readback bistables 202e, 203e, 204e, and 204f are connected respectively to the outputs of the sets of input bistables 202a, 203a, 204a, and 204c.

The readback bistables 202e, 203e, 204e, and 204f are loaded with the values contained in the corresponding sets of input bistables 202a, 203a, 204a, and 204c when a general load signal appears.

Sets of readback bistables 202b, 203b, 204b, and 204d are connected respectively to the outputs of the sets of readback bistables 202e, 203e, 204e, and 204f.

The readback bistables 202b, 203b, 204b, and 204d are loaded with the values contained in the sets of readback bistables 202a, 203a, 204a, and 204c when a sample enable signal appears indicating that the samples $Y_p$ and $Y_q$ are valid.

The parameter a is available from the output of readback bistables 202b. The parameter b is available from the output of the set of readback bistables 203b. The parameter $\log|\alpha|$ is available from the outputs of the sets of readback bistables 204b and 204d.

The parameters $\log|\beta|$, $\log|\sin \delta\theta|$, and $\log|\cos \delta\theta|$, and the signs of $\sin \delta\theta$ and $\cos \delta\theta$ are read in similar manner using sets of bistables 205, 206, and 207.

An adder 210 has one input receiving the samples $Y_p$ and another input receiving the parameter a from the bistables 202. At its output it generates the difference $|Y_p-a|$, together with a signal representative of the sign of the difference.

Similarly, an adder 220 has one input receiving the samples $Y_q$ and another input receiving the parameter b from the bistable 203. At its output it provides the difference $|Y_q-b|$ together with a signal representative of the sign of the difference.

The signal representing the difference $|Y_p-a|$ from the adder 210 is applied to the input of a PROM 211. This generates a signal at its output representative of the logarithm $\log|Y_p-a|$. The signal $\log|Y_p-a|$ is applied to a set of synchronizing bistables 212. This set of bistables also receives the sign signal from the adder 210.

Similarly, the difference signal $|Y_q-b|$ from the adder 210 is applied to the input of a PROM whose output provides the logarithm $\log|Y_q-b|$. The logarithm $\log|Y_q-b|$ is applied to the input of a set of synchronization bistables 222. This set of bistables also receives the sign signal from the adder 220.

An adder 230 has an input receiving the signal $\log|Y_p-a|$ from the bistable 212, and an input receiving the signal $\log|\alpha|$ from the bistable 204. At its output it provides the signal $\log|Y_p-a|+\log|\alpha|$.

Similarly, an adder 231 has one input receiving the signal $\log|Y_q-b|$ from the bistables 222 and another input receiving the signal $\log|\beta|$ from the bistables 205. Its output provides the signal $\log|Y_q-b|+\log|\beta|$.

Figure 6:
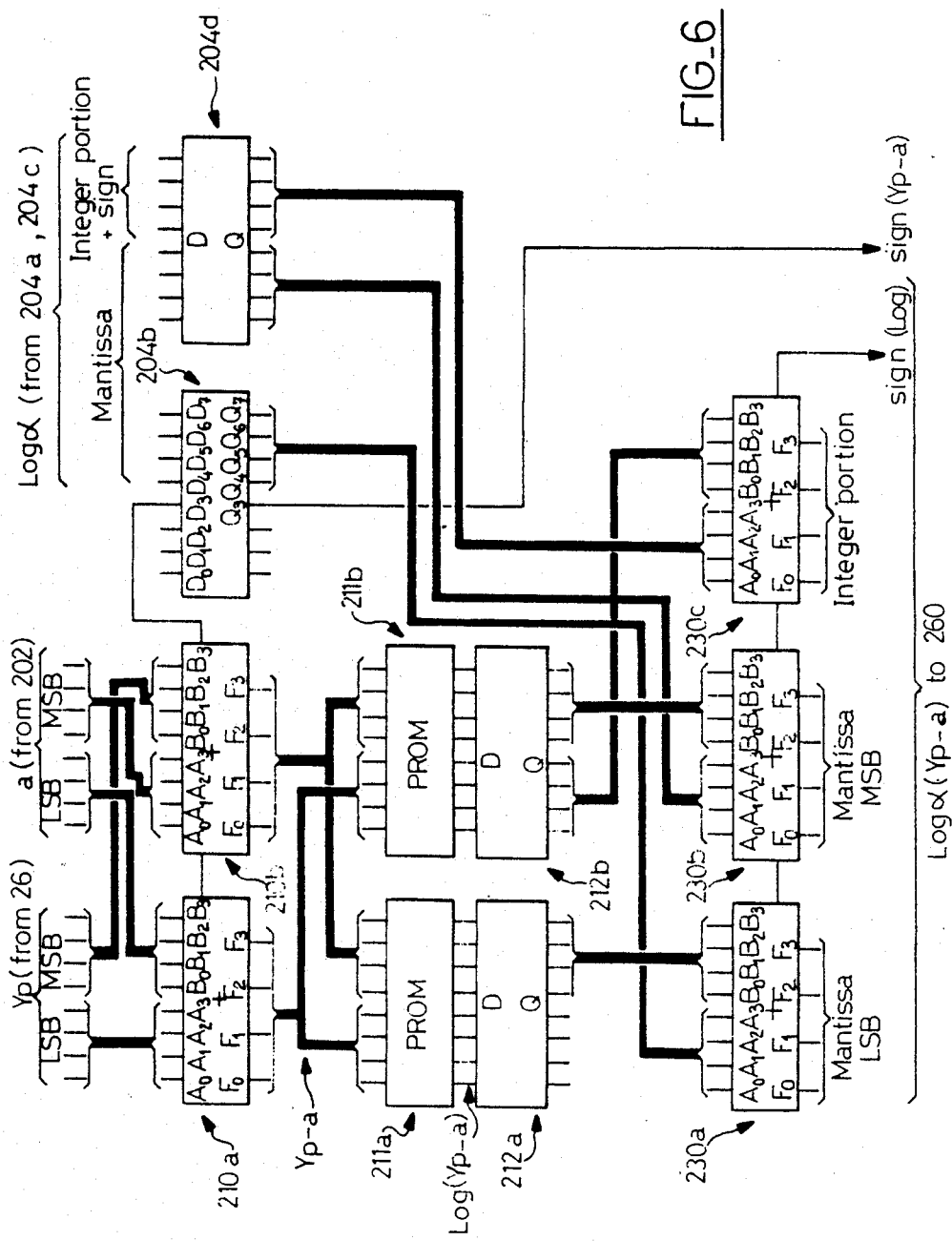

Accompanying FIG. 6 shows the detail of an embodiment of the adder 210, the PROM 211, the bistables 212 and the adder 230.

The same structure is used in adder 220, PROM 221, bistables 222, and adder 231 for calculating (in the form of a sign and a logarithm) the product $\log|Y_q-b|+\log|\beta|$.

As shown in accompanying FIG. 6, adder 210 comprises two cascade-mounted 4-bit adder chips 210a and 210b, e.g. of the type 74F181. Chip 210a has inputs A0 to A3 receiving the four least significant bits of samples the $Y_p$. Chip 210a has inputs B0 to B3 receiving the four least significant bits of the parameter a from the bistables 202. Chip 210b has inputs A0 to A3 receiving the four most significant bits of the parameter a and inputs B0 to B3 receiving the four most significant bits of samples $Y_p$.

The PROM 211 comprises two 8-bit PROM chips 211a and 211b, e.g. of the type 82S135 (256×8 PROM).

PROM chip 211a receives the four bits from adder chip 210a on its inputs A0 to A3 and the four bits from adder chip 210b on its input A4 to A7.

Similarly, PROM 211b receives the four bits from adder 210a on its inputs A0 to A3 and the four bits from adder chip 210b on its inputs A4 to A7.

The set of bistables 212 comprises two 8-bistable chips 212a and 212b, e.g. of the type 74F374. The inputs of bistable chips 212a and 212b are connected to the outputs from PROM chips 211a and 211b respectively.

Adder 230 comprises three 4-bit adder chips 230a, 230b, 230c, e.g. of type 74F181.

Inputs A0 to A3 of adder chip 230a receive the four least significant bits of the mantissa of $\log(\alpha)$ from the set of readback bistables 204b, and inputs B0 to B3 receive the four mantissa bits from bistables 212a.

Adder chip 230b has its inputs A0 to A3 receiving the four most significant bits of the mantissa of $\log(\alpha)$ from the set of readback bistables 204d, and has its inputs B0 to B3 receiving the four most significant bits of the mantissa from the set of bistables 212b.

Adder chip 230c has its inputs A0 to A3 receiving four bits comprising the integer portion and the sign of $\log(\alpha)$ from the set of readback bistables 204d, and has its inputs B0 to B3 receiving the four bits representing the integer portion and the sign from the set of bistables 212b.

The sign of $Y_p-a$ is identical to the sign of the product $\alpha(Y_p-a)$ and is output separately. It is taken from the output of adder chip 210b and preferably transits through a stage of the set of readback bistables 204b.

An adder 240 has one set of inputs connected to receive the signal $\log|Y_q-b|+\log|\beta|$ from adder 231 and another set receiving the signal $\log|\sin \delta\theta|$ from the set of bistables 206. It generates an output signal $\log|Y_q-b|+\log|\beta|+\log|\sin \delta\theta|$. This signal together with the sign bit delivered by an exclusive-OR gate 243 is applied to a set of bistables 241 whose output is applied to a PROM 242 which delivers the antilogarithm. The signal $\beta(Y_q-b)\sin(\delta\theta)$ is consequently available at the output from the PROM 242.

Figure 7:
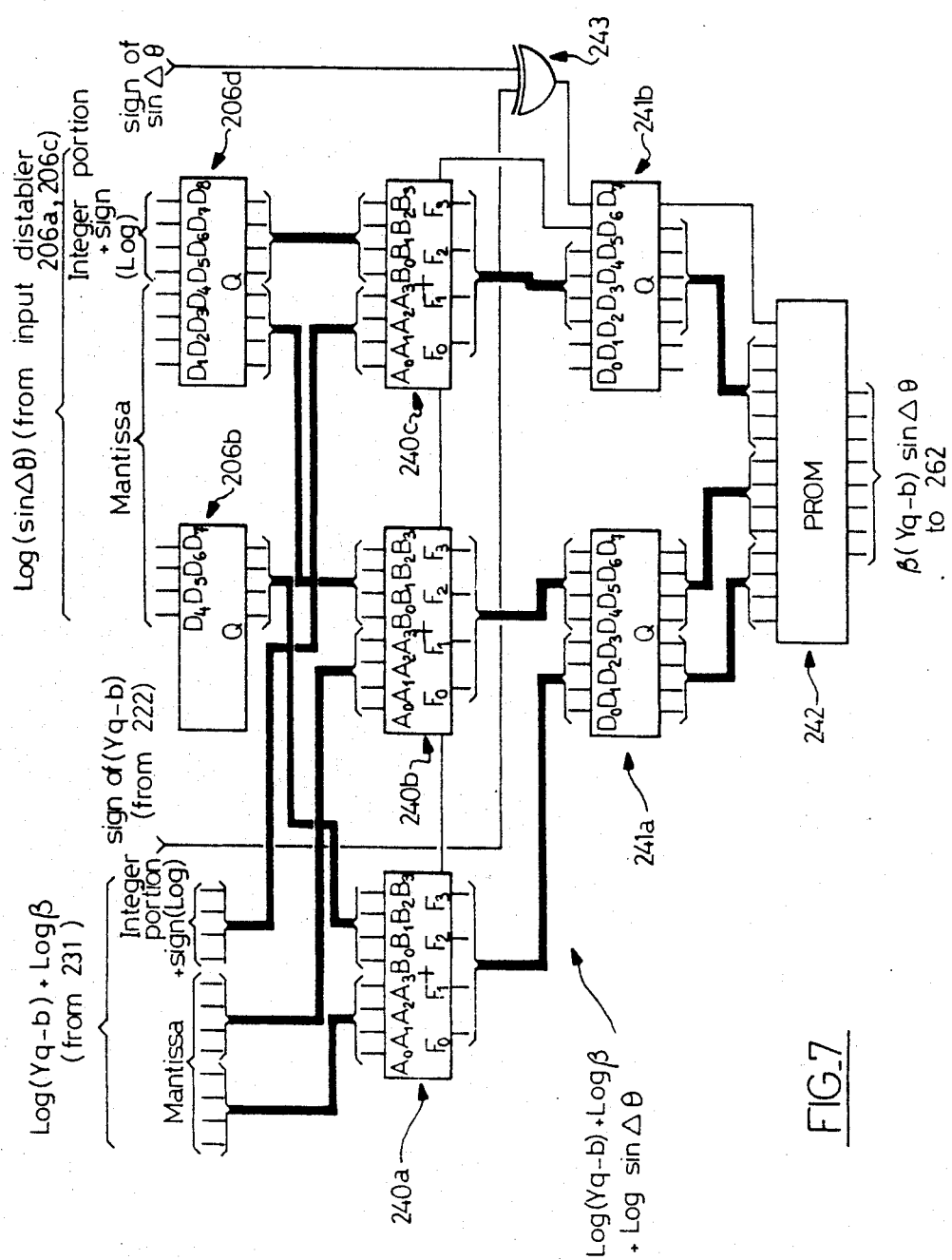

Accompanying FIG. 7 shows an implementation of adder 240, the set of bistables 241, and the PROM 242.

As shown in FIG. 7, adder 240 comprises three 4-bit adder chips 240a, 240b, and 240c. Chip 240a has its inputs A0 to A3 receiving the four least significant bits of the mantissa of the signal $\log|Y_q-b|+\log|\beta|$ from adder 231 and has its inputs B0 to B3 receiving the four least significant bits of the mantissa of the signal $\log|\sin \delta\theta|$ from the set of bistables 206.

Adder chip 240b has its inputs A0 to A3 receiving the four most significant bits of the mantissa of the signal from adder 231 and has its inputs B0 to B3 receiving the four most significant bits of the mantissa of the signal from the bistables 206.

Adder chip 240c has its inputs A0 to A3 receiving the four bits representing the integer portion and the sign of the signal from adder 231, and its input B0 and B3 receiving the four bits representing the integer portion and the sign of the signal from the bistables 206.

The adder chips 240a, 240b, and 240c may be of the 74F181 type, for example.

The set of bistables 241 comprises two 8-bistable chips 241a and 241b, e.g. of the type 74F374.

Bistable chip 241a has its inputs D0 to D3 receiving the 4 bits from adder chip 240a, and its inputs D4 to D7 receiving the four bits from adder chip 240b. Bistable chip 241b has its inputs D2 to D5 receiving the four bits from adder chip 240c, its input D6 receiving the carry bit from adder chip 240c, and its input D7 receiving the signal output by exclusive-OR gate 243, e.g. of the type 74F86. This exclusive-OR gate has one input connected to receive a signal representative of the sign of $(Y_q-b)$, and its other input connected to receive the signal representative of the sign of $\sin \delta\theta$.

The PROM 242 shown in FIG. 7 comprises a chip having 14 address inputs and 8 outputs, e.g. of the type 82HS1281. The eight least significant inputs of the PROM 242 are connected to the outputs from bistable chip 241a. The six most significant inputs of memory chip 242 are connected to the most significant outputs of bistable chip 241b.

The product $\beta(Y_q-b)\cos \delta\theta$ is obtained by means of an adder 250, a set of bistables 251, a PROM 252, and an exclusive-OR gate 253 entirely similar to the adder 240, the bistables 241, the PROM 242, and the exclusive-OR gate 243.

The adder 250 has one input receiving the signal from adder 231 and another input receiving the signal from bistables 207. The outputs from the adder 250 are connected to the inputs of bistables 251. The outputs from these bistables are connected to the inputs of PROM 252.

The exclusive-OR gate 253 has one input connecting a signal representative of the sign of $(Y_q-b)$, and another input receiving a signal representative of the sign of $\cos \delta\theta$ from the bistables 207. Corrected samples $Z_q$ are available at the output from PROM 252.

The inputs of a set of bistables 260 receive the outputs from adder 230 and the signal representative of the sign of $(Y_p-a)$ from bistables 212. The outputs from the bistables 260 are connected to the address inputs of a PROM 261. This PROM serves to take the antilogarithm of the signal $\log|Y_p-a|+\log|\alpha|$. This causes the signal $\alpha(Y_p-a)$ to be made available at the output from PROM 261.

Final calculation of $Z_p$ is performed in an adder 262 having one input receiving the output from PROM 261 and having another input receiving the output from PROM 242.

Accompanying FIG. 8 shows an embodiment of the PROM 261 and the adder 262.

As shown FIG. 8, PROM 261 comprises a chip having 14 address inputs and 8 output bits, e.g. of the type 82HS1281. The outputs from the PROM 261 are preferably connected to a set of intermediate bistables 263.

The adder 262 shown in FIG. 8 comprises two 4-bit adder chips 262a, 262b, e.g. of the type 74F181.

The chip 262a has its inputs A0 to A3 receiving the four least significant bits from bistable chip 263 and has its inputs B0 to B3 receiving the four least significant bits of the signal from PROM 242.

Adder chip 262b has its inputs A0 to A3 receiving the four most significant bits from PROM 242, and its inputs B0 to B3 receiving the four most significant bits from the set of bistables 263.

The present invention offers the following advantages, in particular.

It enables faults in the analog portion of the demodulator to be estimated and corrected dynamically.

It also makes it possible to regulate the level of the processed signal. The digital implementation facilitates insertion in demodulators which process the signal digitally.

The fault corrector of the present invention may be used on an existing digital link without requiring that link to be modified.

Naturally, the present invention is not limited to the particular embodiment described above, but extends to any variant coming within the scope of the claims.

We claim:

1. A demodulator for digital transmission using the technique known per se of transposing the signal to baseband and comprising separator means for operating a received HF signal into first and second identical auxiliary signals, a local oscillator providing an in-phase output signal and a quadrature output signal at 90° to its in-phase output signal, a first mixer for transposing the first auxiliary signal into an in-phase base component by multiplying it with the in-phase output signal from the local oscillator, a second mixer for transposing the second auxiliary signal into a quadrature base component by multiplying it with the quadrature output signal from the local oscillator, and respective filter and amplifier means and analog-to-digital converters connected to the outputs from each of the mixers, wherein the demodulator further includes:

estimation means suitable for estimating faults on groups of samples $Y_{p,k}$, $Y_{q,k}$ taken from the outputs of the analog-to-digital converters, faults being estimated in the form of five parameters, namely: the corrective gain $\alpha$ to be applied to the in-phase channel, the corrective gain $\beta$ to be applied to the quadrature channel, the voltage offset a on the in-phase channel, the voltage offset b on the quadrature channel, and phase error $\delta\theta$ relative to true quadrature; and correction means for correcting the current samples $Y_p$, $Y_q$, on the basis of the parameters estimated on an earlier group of samples.

2. A demodulator according to claim 1, wherein the corrected samples $Z_{p,n}$ and $Z_{q,n}$ are established on the basis of the following equations:

$$Z_{p,n}=\alpha(Y_{p,n}-a)+\beta(Y_{p,n}-b)\cdot\sin \delta\theta \quad (7)$$

$$Z_{q,n} = \beta(Y_{q,n} - b) \cdot \cos \delta\theta \quad (8)$$

in which:
- $\alpha$ = the corrective gain to be applied to the in-phase channel;
- $\beta$ = the corrective gain to be applied to the quadrature channel;
- a = the voltage offset on the in-phase channel;
- b = the voltage offset on the quadrature channel;
- $\delta\theta$ = the phase error relative to true quadrature;
- $Y_{p,n}$ = current samples on the in-phase channel prior to correction; and
- $Y_{q,n}$ = current samples on the quadrature channel prior to correction.

3. A demodulator according to claim 1, wherein the parameter a representing the voltage offset on the in-phase channel is obtained by taking the average of the samples $Y_{p,k}$ on the in-phase channel using the equation:

$$a = \frac{1}{N} \sum_{k=1}^{N} Y_{p,k} \quad (1)$$

4. A demodulator according to claim 1, wherein the parameter b representing the voltage offset on the quadrature channel is obtained by taking the average of the samples $Y_{q,k}$ on the quadrature channel using the equation:

$$b = \frac{1}{N} \sum_{k=1}^{N} Y_{q,k} \quad (2)$$

5. A demodulator according to claim 1, wherein the parameter $\alpha$ representative of the corrective gain to be applied to the in-phase channel is obtained using the equation:

$$\alpha = \frac{\sigma \sqrt{N} \sqrt{\sum_{k=1}^{N} (Y_{q,k} - b)^2}}{\sqrt{\sum_{k=1}^{N} (Y_{p,k} - a)^2 \cdot \sum_{k=1}^{N} (Y_{q,k} - b)^2 - \left[\sum_{k=1}^{N} (Y_{p,k} - a)(Y_{q,k} - b)\right]^2}} \quad (4)$$

6. A demodulator according to claim 1, wherein the parameter $\beta$ representative of the corrective gain to be applied to quadrature channel is determined using the equation:

$$\beta = \frac{\sigma \sqrt{N} \sqrt{\sum_{k=1}^{N} (Y_{p,k} - a)^2}}{\sqrt{\sum_{k=1}^{N} (Y_{p,k} - a)^2 \cdot \sum_{k=1}^{N} (Y_{q,k} - b)^2 - \left[\sum_{k=1}^{N} (Y_{p,k} - a)(Y_{q,k} - b)\right]^2}} \quad (5)$$

7. A demodulator according to claim 1, wherein the ratio $\alpha/\beta$ of the corrective gains to be applied to the in-phase channel and the quadrature channel is obtained by the root mean square of the differences $(Y_{p,k} - a)$ and $(Y_{q,k} - b)$, i.e. on the basis of the equation:

$$\alpha/\beta = \sqrt{\sum_{k=1}^{N} (Y_{q,k} - b)^2} \Big/ \sqrt{\sum_{k=1}^{N} (Y_{p,k} - a)^2} \quad (3)$$

8. A demodulator according to claim 1, wherein the parameter $\delta\theta$ representative of phase error relative to true quadrature is estimated on the basis of the equation:

$$\sin \delta\theta = -\sum_{k=1}^{N} (Y_{p,k} - a)(Y_{q,k} - b) \Big/ \sqrt{\sum_{k=1}^{N} (Y_{p,k} - a)^2 \cdot \sum_{k=1}^{N} (Y_{q,k} - b)^2} \quad (6)$$

9. A demodulator according to claim 1, wherein the estimation means include a microprocessor.

10. A demodulator according to claim 1, wherein the correction means are constituted by hard-wired logic.

11. A demodulator according to claim 1, wherein the estimation means deliver some of the estimated parameters in the form of logarithms, and the correction means include adders.

12. A demodulator according to claim 1, wherein the correction means include memories for transforming numbers into their logarithms, and memories for performing the inverse transformation.

13. A demodulator according to claim 1, wherein the correction means include readback bistables enabling signals to be synchronized.

14. A demodulator according to claim 1, wherein the correction means comprise the following digital components:
- a first set of bistables receiving the parameter a representing the voltage offset on the in-phase channel;
- a second set of bistables receiving the parameter b representing the voltage offset on the quadrature channel;
- a third set of bistables receiving the logarithm of the parameter $\alpha$ representative of the corrective gain to be applied to the in-phase channel;
- a fourth set of bistables receiving the logarithm of the parameter $\beta$ representative of the corrective gain to be applied to the quadrature channel;
- a fifth set of bistables receiving the logarithm of the sine of the parameter $\delta\theta$ representative of the phase error relative to true quadrature;

a sixth set of bistables receiving the logarithm of the cosine of the parameter $\delta\theta$ representative of phase error;

a first adder having its inputs connected to receive the current samples $Y_p$ on the in-phase channel and the signal from the first set of bistables;

a first memory converting the output signal from the first adder into the logarithm thereof;

a seventh set of bistables connected to the output of the first memory;

a second adder having its inputs connected to receive the signals from the third and seventh sets of bistables;

a third adder having its inputs connected to receive the current samples $Y_q$ on the quadrature channel and the signal from the second set of bistables;

a second memory converting the output signal from the third adder into its logarithm;

an eighth set of bistables connected to the output from the second memory;

a fourth adder having its inputs connected to receive the signals from the fourth and eighth sets of bistables;

a fifth adder having its inputs connected to receive the signals from the fifth set of bistables and from the fourth adder;

a sixth adder having its inputs connected to receive the signals from the sixth set of bistables and from the fourth adder;

a ninth set of bistables connected to the output from the second adder;

a third memory for providing the antilogarithm of the signal delivered by the ninth set of bistables;

a tenth set of bistables connected to the output from the fifth adder;

a fourth memory for taking the antilogarithm of the signal delivered by the tenth set of bistables;

a seventh adder having its inputs connected to receive the signals from the third and fourth memories and delivering corrected samples $Z_p$ at its output;

an eleventh set of bistables connected to the output from the sixth adder; and a fifth memory providing the antilogarithm of the signal delivered by the eleventh set of bistables and delivering corrected samples $Z_q$ at its output.

* * * * *